United States Patent [19]
Rokosky et al.

[11] 3,803,949
[45] Apr. 16, 1974

[54] INDEXING MECHANISM

[75] Inventors: Walter P. Rokosky; Michael J. Rokosky, both of Hamden, Conn.

[73] Assignee: Rokler Manufacturing Company, Hamden, Conn.

[22] Filed: Apr. 13, 1972

[21] Appl. No.: 243,671

[52] U.S. Cl. ................................ 74/815, 74/823
[51] Int. Cl. ........................................ B23b 29/32
[58] Field of Search ............ 74/826, 817, 816, 815, 74/813 L, 813 R, 823

[56] References Cited
UNITED STATES PATENTS

| | | | |
|---|---|---|---|
| 2,975,657 | 3/1961 | Samuel | 74/826 X |
| 3,242,771 | 3/1966 | Maier et al. | 74/826 |
| 2,848,909 | 8/1958 | Hill | 74/817 X |
| 3,545,317 | 12/1970 | Shultz et al. | 74/826 X |

Primary Examiner—Benjamin W. Wyche
Assistant Examiner—F. D. Shoemaker
Attorney, Agent, or Firm—DeLio and Montgomery

[57] ABSTRACT

An angular indexing apparatus including a driver member which is rotated between predetermined limits, and upon return carries therewith a table through the predetermined angle. The limits may be set to predetermine any angle within a given angle.

11 Claims, 8 Drawing Figures

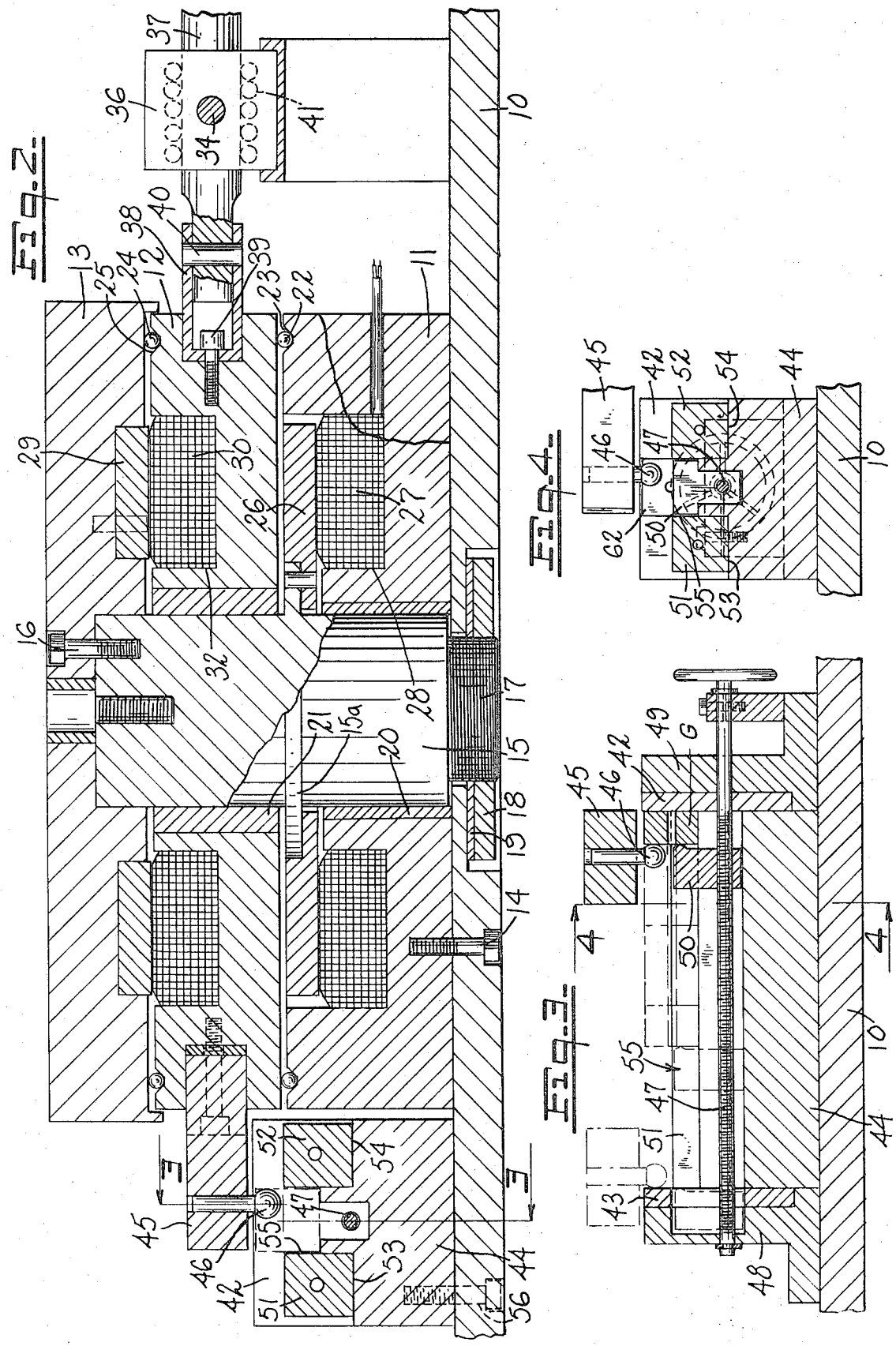

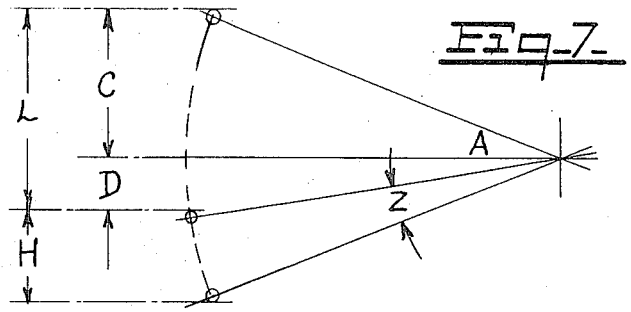
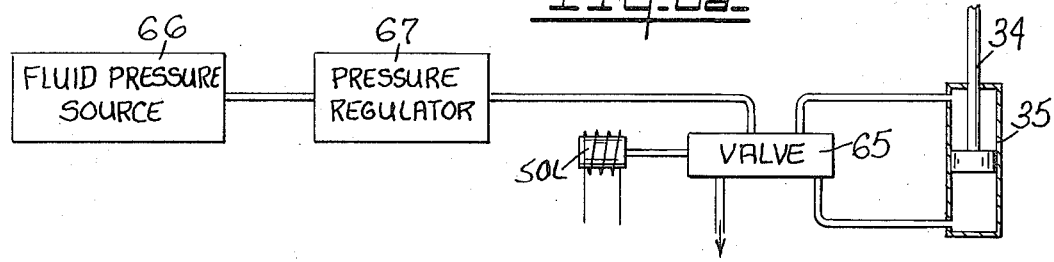
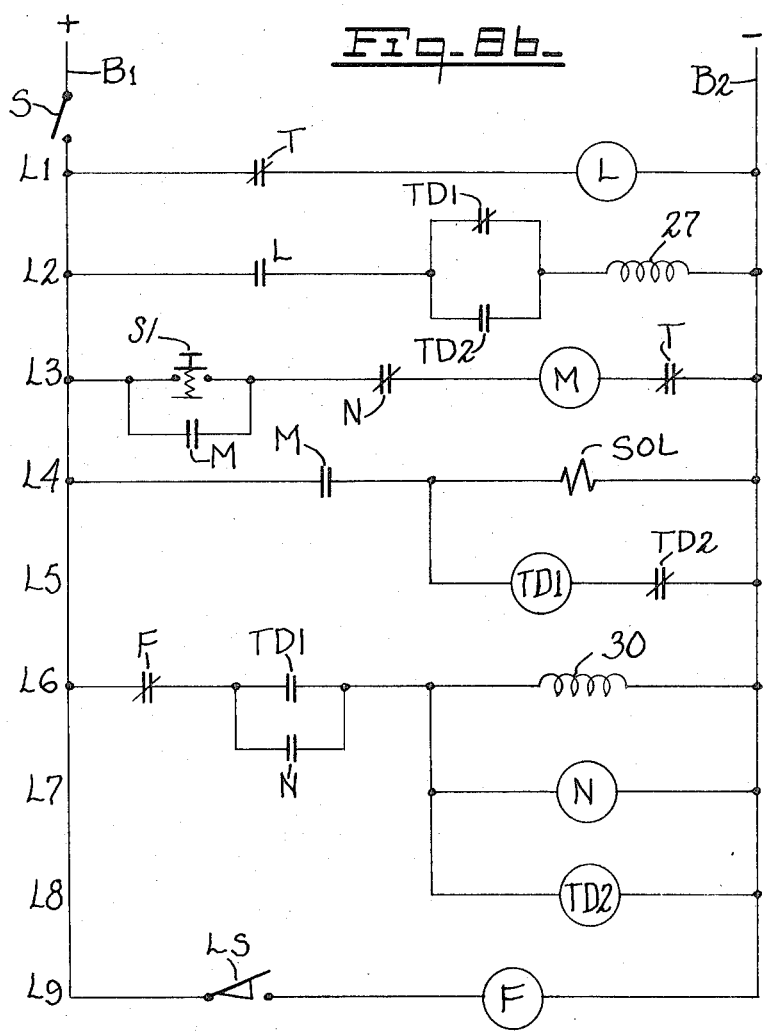

INDEXING MECHANISM

This invention relates to indexing devices and more particularly relates to an angularly indexable work table wherein an infinite number of indexing angles may be predetermined.

In many machine tools such as drill presses and jig bores where angular indexing of a table is required, index plates are generally used having pins and sockets in predetermined angular positions. In some cases, a plurality of index rings are provided having notches in different angular relationships.

While these gauge plates may be very accurate in providing for angular indexing, they are limited in the number of indexable positions provided thereon, and cannot provide repetitive indexing of odd angles where the angles may be non-integers.

In view of these limitations on known angle indexing plates the present invention provides a new and improved indexing apparatus in which any angle to be indexed may be predetermined, and thereafter a work-supporting table indexed repetitively through the selected angle.

Briefly stated, the invention in one form thereof comprises a rotatable driver member movable between fixed limits which predetermine an angle of index and a table selectably rotatable with respect to the drive member and movable therewith. During each indexing operation, the drive member moves to one fixed limit of rotation while the table is stationary and then the drive member is moved to the other limit of rotation with the table in fixed relation thereto. The operation is repeated until all of the work operations have been performed on a workpiece carried by the table.

An object of this invention is to provide an indexable table having new and improved means for accurately selecting any angle for repetitive indexing purposes.

Another object of this invention is to provide an indexing table which is highly accurate and has new and improved construction for transporting the table through the indexing angle.

A further object of this invention is to provide a device of the type described which is of relatively simple economical construction.

The features of the invention which are believed to be novel are particularly pointed out and distinctly claimed in the concluding portion of the specification. However, the invention both as to its operation and organization together with further objects and advantages thereof may best be appreciated by reference to the following detailed description taken in conjunction with the drawings, in which:

FIG. 2 is a sectional view in elevation seen in the plane of lines 2—2 of FIG. 1;

FIG. 3 is a sectional view in elevation seen in the plane of lines 3—3 of FIG. 2;

FIG. 4 is a sectional view seen in the plane of lines 4—4 of FIG. 3;

FIG. 7 is an angular representation of the determination of an angle; and

Figure 1:
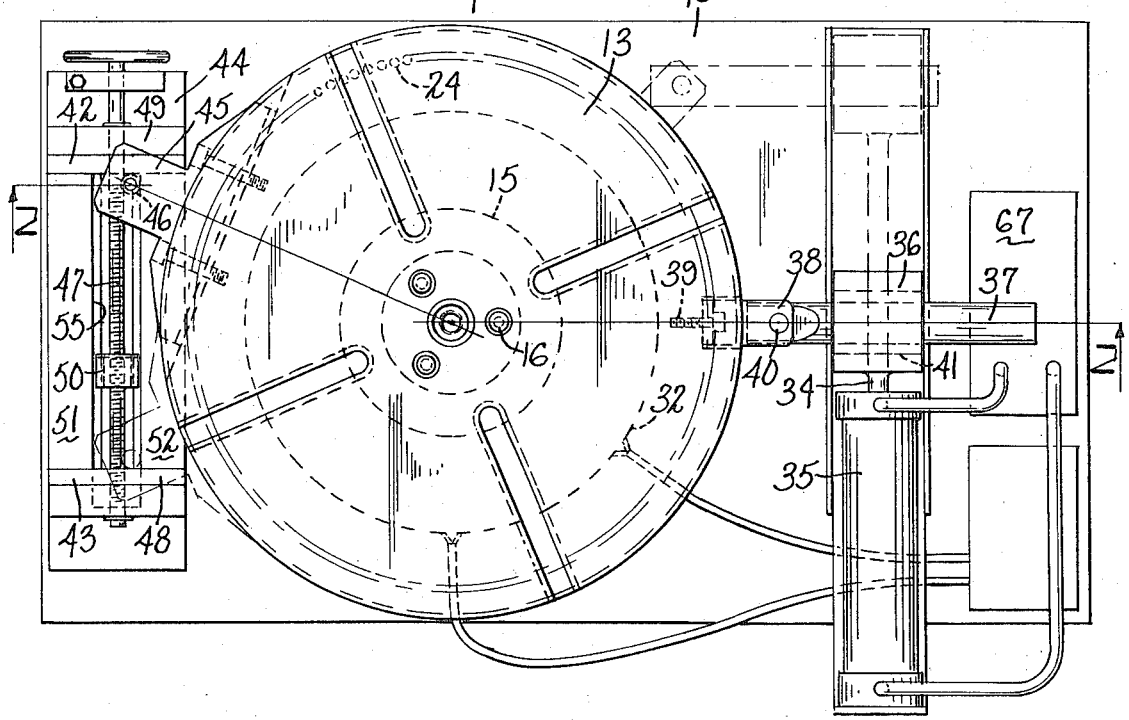
FIG. 1 is a plan view of an apparatus embodying the invention.

FIGS. 8a and 8b exemplify the operative controls for the apparatus of FIGS. 1 - 3.

The apparatus generally comprises a base member 10 carrying thereon a bottom member 11, a driver member 12 and a follower member 13. Follower member 13 may be a work table or may have a work table attached thereto.

Member 11 is secured to base 10 as by means of a plurality of bolts 14, or may be constructed integral therewith.

Member 13 is affixed to a shaft 15 as by a plurality of bolts 16. Shaft 15 may rotate with respect to member 11 and includes a threaded portion 17 receiving a nut or fastening device 18 which extends through a bearing member 19 against the base 10. Shaft 15 may rotate in a bearing member 20 in base 11. Member 12 receives therein a bearing or bushing 21 and is rotatable about shaft 15. Bearing means are provided between members 11 and 12 in the form of a plurality of balls 22 received in an annular groove 23 defined in the upper surface of member 11.

Bearing means in the form of a plurality of balls 24 are received in an annular groove 25 in the upper surface of member 12 to permit member 12 to freely rotate with respect to member 13.

For purposes hereinafter described, means are provided to lock member 12 in a given angular relationship with member 11, and means are also provided to lock member 13 in a given angular relationship with respect to member 12.

Secured to a radially extending flange 15a on shaft 15 is a disc of magnetic material 16 which is adapted to coact with an annular coil 27 received in an annular recess 28 provided therefor in member 11. When coil 27 is energized, member 26 will provide a magnetic flux return path and may be locked with respect to member 11 in an infinite number of angular relationships with respect thereto.

Inasmuch as member 13 is non-rotatable with respect to shaft 15 it may thus be locked with respect to member 11 upon energization of coil 27. While the coil 27 and disc 26 provide a preferred locking means, and will be seen to basically comprise a magnetic brake, any other locking means which will provide an infinite number of angular relationships between member 13 and member 11 may be utilized.

Member 12 is rotatable with respect to shaft 15, but may be locked in a given position with respect thereto through member 13. A second locking means is provided between members 12 and 13 and comprises a disc 29 of magnetic material carried by member 13, and a coil 30 carried in a recess 32 in member 12.

The locking means provide several relationships between members 11, 12 and 13. When both locking means are energized, all three members are rigidly locked together. When the locking means between shaft 15 and member 11 is energized, members 11 and 13 are locked in position, but member 12 may rotate about shaft 15.

When coil 30 is energized and coil 27 is not energized, members 12 and 13 may be rotated with shaft 15.

Means are provided for rotating member 12 as exemplified by the piston 34 of a pneumatic or hydraulically actuated cylinder 35. Piston 34 includes a head portion 36 which carries a rod 37 which is slidable therein. A yoke 38 connected to member 12 as by means of bolts 39 is connected to rod 37 as by means of a pin 40.

When piston 34 is extended to the position shown in broken line in FIG. 1, rod 37 will move transversely of the direction of movement of the piston through head 36 on bearing assembly 41 and rotate member 12 until member 12 is stopped as hereinafter described. Then, upon retraction of piston 34, member 12 is returned to its starting point. If at this time, member 13 is locked to member 12 and not locked to member 11, the retraction of piston 34 will move member 13 through a predetermined angle.

The angular movement of member 12 and, hence, member 13 is predetermined by precisely positioned limit stops shown as 42 and 43 mounted to a fixture 44 on base 11, as more clearly shown in FIG. 3. An arm 45 extends radially from member 12 and carries thereon a member having a depending gauge ball portion 46 which may move between the facing surfaces of members 42 and 43. The members 42 and 43 are set apart a predetermined distance very accurately measured, as by precision gauge blocks, which distance may be selected to allow an angle 2A of movement of member 12 considering the radius R from the center of shaft 15 to the center of ball 46. The ball is of known diameter and the diameter thereof need not be considered. With this arrangement, the member 12 may move through a maximum angle 2A. The radius R of movement of the ball 46 is also known, and the chord 2C of the arc subtending angle A is also known.

Also, the chord 2C is known from the equation $$C = R \sin A \quad (1)$$

Figure 6:
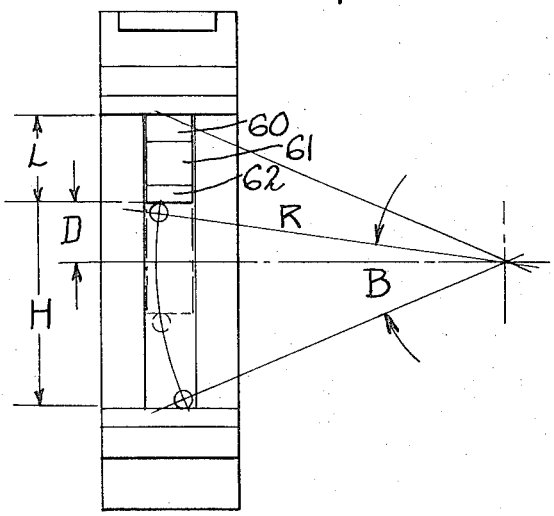

Assume that it is desired to set the angle B as shown in FIG. 6, then the distance $L = C - D$ must be determined.
Then $$D = R (\sin B{-}A) \quad (2)$$

since B is greater than A
then $$L = C - D \quad (3)$$

The values of A and B may easily be obtained from precise trig tables, and since C is known from the predetermined angle A, the distance L may be determined and set with accurate gauge blocks to predetermine the distance H for angle B.

In some angles, the trig tables, even though carried to six places, are not exact when summed for a full circle or arc of many holes, and compensation must be made for accumulated error.

Consider the example shown in FIG. 7 in which the angle to be set is Z. From the preceding development, it will be apparent that $$L = C + D \quad (4)$$

$$D = R \sin (A{-}Z) \quad (5)$$

$$L = C + R \sin (A{-}Z) \quad (6)$$

Assume, it is desired to drill 31 holes equiangularly about a center point and $2A = 45°$. 31 points from the trig tables are spaced apart 11° 36′ 46″, but if multiplied by 31 would total only 359° 49′ 46″, an error accumulation of −14″. This will correspond to an error of 14″/31 or E between each hole.

If $A = 22° 29′ 60″$
and $Z = 11° 36′ 14″$
then $A{-}Z = 10° 53′ 46″$
$D = R (\sin 10° 53′ 46″)$
$Z{-}E = Z'$
$D' = R \sin Z'$ Then $D{-}D'/31$ is the correction to add to D to produce the correct dimension of L and hence H.

The error, as the case may be, may be compensated by either adding or subtracting $D'$ with respect to D. Then $$L = C + R (\sin 9° 53′ 46″) - R (\sin 14″)/31$$

The spacing H will be increased by $R (\sin 14′)/31$ to compensate for the negative accumulation error.

In a preferred form the fixture 44 may include a screw shaft 47 mounted between end walls 48 and 49. A clamping block 50 is threadably received on screw shaft 47 and moves linearly between guide blocks 51 and 52 upon rotation of screw shaft 47. The function of clamp 50 is to clamp a gage block G in the space between limit stops 42 and 43 and predetermine the distance that ball 46 may move therebetween. Guide blocks 51 and 52 may be mounted on ledges 53 and 54, respectively, provided therefor on fixture 44 and define a guide channel 55 for clamp 50.

It will be understood that the fixture 44 may be made with the channel 55 defined in a fixture with the guides 51 and 52 integral therewith. The fixture 44 may be made integral with base 10, or secured thereto as by means of the bolts 56.

Figure 5:
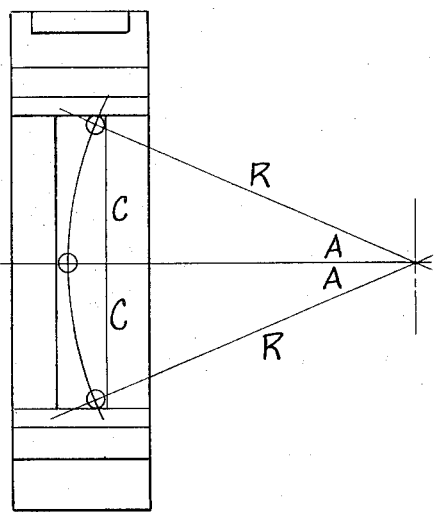
FIGS. 5 and 6 are top plan views of a portion of FIG. 1 showing the manner in which an indexing angle is set.

The arc of travel of the center of ball 46 will subtend a predetermined angle 2A, and have a chord 2C for a predetermined radius R, as exemplified in FIG. 5. By insertion of gage blocks 60, 61, 62 between limit members 42 and 43 (FIG. 6) a dimension L and hence H may be predetermined. The dimension H will determine the angular movement of arm 45 and member 12.

The operations of the table may be manually controlled in a series of steps, may be made completely automatic, or may be arranged for any degree of supervisory control. A control circuit which may be utilized is shown in FIG. 8.

Cylinder 35 receives and exhausts fluid pressure through a solenoid operated two-way valve 65 having a coil SOL. Fluid pressure is supplied from a source 66 which may be a central compressor in a shop. A conventional pressure regulator relief 67 is also provided.

A control circuit for operation of the apparatus is shown in FIG. 8 to accomplish the following steps:

1. Energize coil 27 to lock member 13 to member 11.

2. Energize solenoid SOL to move member 11 through the predetermined angle while member 12 is locked in place.

3. Energize coil 30 to lock member 11 to member 12 and de-energize coil 27 to unlock member 12 from member 10.

4. De-energize solenoid SOL to return member 11 through the angle while carrying member 12 therewith.

5. Energize coil 27 for a work operation, and

6. De-energize coil 30 and repeat step (2).

The network comprises various sequenced switching apparatus connected between bus lines B1 and B2.

When switch S is closed, relay L is energized and picks up its contact in line L2. Coil 27 is energized through contacts L and TD1, and member 13 is locked to member 11.

When Switch S1 in line L3 is momentarily closed, relay M is energized and latches itself in. Solenoid coil SOL in line L4 is then energized through contact M, and relay TD1 having a short time delay is energized. The time delay is sufficient for cylinder 35 to move driven member 12 through the predetermined angle. When TD1 times out, it opens its contact in line L2 to de-energize coil 27 and its contact in line L6 is closed and coil 30 energized. Relay N in line L7 is energized, and opens its contact in line L3 to de-energize relay M and solenoid SOL.

Cylinder 34 now moves member 12 back through the predetermined angle, and member 13 therewith since coil 30 is energized.

Relay TD2 is energized to pick up its contact in line L2 to energize coil 27 at a time after member 12 has moved back through the predetermined angle. At this time, table member 13 has advanced the predetermined angle and the complete unit is rigidly locked.

After the work operation, which may be a drilling operation, a switch LS, which may be a limit switch responsive to retraction of the drill, is closed to energize relay F. When the F contacts are opened coil 30 is de-energized together with relays N and TD2. Coil 27 is then energized through the normally closed TD1 contact, and another index cycle may be initiated by closing switch S1. Controlled contact T may be closed in lines L1 and L3 to disable the network upon happening of any given event. The relay for controlling contact T is not shown, but is made responsive to such event.

The foregoing control is set forth only to exemplify the sequence of operation. Various other arrangements may be utilized.

It may thus be seen that the objects of the invention set forth as well as those made apparent from the preceding description are efficiently attained. Other embodiments of the disclosed invention, as well as modifications to the disclosed embodiment may occur to those skilled in the art. Accordingly, the appended claims are intended to cover all embodiments of the invention and modifications of the disclosed embodiments thereof which do not depart from the spirit and scope of the invention.

What is claimed is:

1. An indexing mechanism comprising a base, a rotatable member, first and second motion limiting stop members, means for varying the distance between said stop members, stop engaging means on said rotatable member disposed between said stop members, said motion limiting stop members defining the limits of travel of said rotatable member, a table rotatable about the same axis as said rotatable member, locking means for selectively engaging said table with said rotatable member and locking means for selectively engaging said table with said base, and drive means for reversibly rotating said rotatable member through the angle defined by said motion limiting stop members, whereby said rotatable member may rotate through the angle predetermined by the angular spacing of said stop members in a first direction without moving said table, and may then rotate in the opposite direction through said angle and carry said table therewith through said predetermined angle to a desired new index position.

2. The apparatus of claim 1 further comprising a shaft, said shaft being rotatable with respect to said base member, said rotatable member being rotatably mounted on said shaft, said table member being non-rotatably mounted to said shaft, first means for locking said shaft to said base member while said rotatable member is rotated in one direction by said drive means, and second means for locking said table member to said rotatable member when the rotatable member is rotated in the other direction by said drive means.

3. The apparatus of claim 1 wherein said limiting members provide spaced apart surfaces, said means on said rotatable member is an arm extending from said rotatable member between said surfaces and arranged to terminate movement of said rotatable member as it engages said surfaces.

4. The apparatus of claim 1 wherein said drive means is effective to rotate said rotatable member between said limiting members and hold said rotatable member at the limits defined by said limiting members.

5. The apparatus of claim 1 further including a bi-directional fluid operated cylinder piston coupled to said rotatable member and arranged to drive said rotatable member between said limiting members and hold said drive member at one of the limits defined by said limiting members.

6. The apparatus of claim 2 wherein both of said locking means are electromagnets.

7. The apparatus of claim 1 wherein said limiting members are included in a fixture in fixed predetermined relation to the axis of rotation of said drive means, said limiting members providing parallel surfaces spaced a predetermined dimension, said means on said rotatable member is an arm extending therefrom between said surface whereby movement of said arm between said surfaces defines a predetermined angle of movement of said drive means.

8. The apparatus of claim 7 further including means for retaining spacing elements in said fixture between said surfaces to decrease the angle of movement of said rotatable member.

9. The apparatus of claim 8 further including means for clamping spacing elements against one of said surfaces.

10. The apparatus of claim 7 wherein said arm includes a gauge ball of predetermined diameter adapted to contact said surfaces and predetermine the angle of movement of said drive means.

11. A method of indexing an angle of rotation of a table member comprising the steps of providing a rotatable table member, providing a drive member with an extending arm thereon, rotatable about the same axis as said table member, providing linearly spaced apart limits adapted to be engaged by said arm, rotating said drive member from one of said limits to the other while holding said table member fixed, and rotating said drive member to the other of said limits with the table member locked thereto.

* * * * *